United States Patent
Uno

(10) Patent No.: US 12,223,393 B2
(45) Date of Patent: Feb. 11, 2025

(54) EXPECTATION VALUE ASSESSMENT SYSTEM AND METHOD

(71) Applicants: MIZUHO RESEARCH & TECHNOLOGIES, LTD., Tokyo (JP); Mizuho Financial Group, Inc., Tokyo (JP)

(72) Inventor: Shumpei Uno, Tokyo (JP)

(73) Assignees: MIZUHO RESEARCH & TECHNOLOGIES, LTD., Tokyo (JP); Mizuho Financial Group, Inc., Tokyo (JP)

(*) Notice: Subject to any disclaimer, the term of this patent is extended or adjusted under 35 U.S.C. 154(b) by 368 days.

(21) Appl. No.: 17/738,305

(22) Filed: May 6, 2022

(65) Prior Publication Data
US 2022/0374758 A1    Nov. 24, 2022

(30) Foreign Application Priority Data
May 11, 2021    (JP) ................ 2021-080297

(51) Int. Cl.
*G06N 10/60* (2022.01)
*G06N 10/70* (2022.01)

(52) U.S. Cl.
CPC ............. *G06N 10/60* (2022.01); *G06N 10/70* (2022.01)

(58) Field of Classification Search
None
See application file for complete search history.

(56) References Cited

U.S. PATENT DOCUMENTS

| 2019/0384597 A1* | 12/2019 | Horesh | G06N 10/00 |
| 2023/0016119 A1* | 1/2023 | Wei | G06N 10/60 |
| 2023/0306286 A1* | 9/2023 | Wang | G06N 7/01 |
| 2023/0315808 A1* | 10/2023 | Babbush | G06F 17/18 |

FOREIGN PATENT DOCUMENTS

JP    2017059074 A    3/2017

OTHER PUBLICATIONS

Rebentrost et al., "Quantum computational finance: Monte Carlo pricing of financial derivatives," arXiv.org, Cornell University, Apr. 30, 2018, accessed on Feb. 25, 2021, retrieved from https://arxiv.org/abs/1805.00109 17 pages.

Suzuki et al., "Amplitude Estimation without Phase Estimation," Apr. 23, 2019, accessed on Feb. 25, 2021, retrieved from https://arxiv.org/abs/1904.10246 13 pages.

* cited by examiner

*Primary Examiner* — Lisa M Caputo
*Assistant Examiner* — Cynthia L Davis
(74) *Attorney, Agent, or Firm* — Kilpatrick Townsend & Stockton LLP

(57) ABSTRACT

A system obtains an operator that produces a superposition state of a plurality of random variables. The system performs iteration of a first operation and a second operation on an initial quantum state to produce a final quantum state. The first operation produces a second state by performing a computation that inverts a first state with respect to a state obtained by applying a Hermitian conjugate of the operator to a quantum state where the last bit of a bit string is 0. The second operation produces a new first state by performing a computation that inverts the second state with respect to the first state. The system measures the bit string in the final quantum state, records the number of times a quantum state where all bits of the bit string are 0 is observed, and calculate an expectation value of the random variables according to the number.

5 Claims, 9 Drawing Sheets

PRIOR ART

EXPECTATION VALUE ASSESSMENT SYSTEM AND METHOD

CROSS REFERENCE TO RELATED APPLICATIONS

This application claims priority to Japanese Patent Application No. 2021-080297, filed May 11, 2021, the disclosure of which is incorporated by reference herein in its entirety.

BACKGROUND

1. Field

The present disclosure relates to a system and a method that calculates expectation values by quantum amplitude estimation, e.g., for a number of behavior scenarios.

2. Description of Related Art

The calculation of expectation values for random variables such as future behavior scenarios may be applicable to numerous industries and programming solutions, including those that involve closed loop feedback systems. However, accurately calculating such values may require much processing power and time. For example, the algorithms to calculate such expectation values using conventional computers (Monte Carlo method) may need to sample numerous random variables. The scale of processing power and time needed to execute the simulations and analyze their outcomes may make the accurate calculations of such expectation values impractical using conventional computing techniques. Therefore, improvements in the field of expectation value calculations are desired.

SUMMARY

It is an objective of the present disclosure to use quantum amplitude estimation to calculate an expectation value even on noisy quantum computers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one aspect, a system is provided that includes a quantum computing unit and a classical computing unit. The quantum computing unit includes a manipulation unit that manipulates a quantum state, a state maintaining unit that maintains the quantum state, and a measurement unit that observes the quantum state. The classical computing unit performs post-processing based on output from the quantum computing unit. The manipulation unit is configured to obtain a first operator that produces a superposition state of a plurality of random variables. The manipulation unit is configured to produce a final quantum state by performing iteration of a first operation and a second operation on an initial quantum state using the state maintaining unit. The first operation produces a second state by performing a computation that inverts a first state with respect to a state obtained by applying a Hermitian conjugate of the first operator to a quantum state where the last bit of a bit string is 0. The second operation performs a computation that inverts the second state with respect to the first state, thereby producing a new first state. The measurement unit is configured to measure the bit string in the final quantum state. The measurement unit is configured to record, in the classical computing unit, the number of hits that is the number of times a quantum state where all bits of the bit string are 0 is observed. The classical computing unit is configured to calculate an expectation value of the random variables by maximum likelihood estimation according to the number of hits.

In another aspect, a method is provided that is executed by a system. The system includes a quantum computing unit and a classical computing unit. The quantum computing unit includes a manipulation unit that manipulates a quantum state, a state maintaining unit that maintains the quantum state, and a measurement unit that observes the quantum state. The classical computing unit performs post-processing based on output from the quantum computing unit. The method includes: obtaining, using the manipulation unit, a first operator that produces a superposition state of a plurality of random variables; producing, using the manipulation unit, a final quantum state by performing iteration of a first operation and a second operation on an initial quantum state using the state maintaining unit, the first operation producing a second state by performing a computation that inverts a first state with respect to a state obtained by applying a Hermitian conjugate of the first operator to a quantum state where the last bit of a bit string is 0, the second operation performing a computation that inverts the second state with respect to the first state, thereby producing a new first state; measuring, using the measurement unit, the bit string in the final quantum state; recording, using the measurement unit and in the classical computing unit, the number of hits that is the number of times a quantum state where all bits of the bit string are 0 is observed; and calculating, using the classical computing unit, an expectation value of the random variables by maximum likelihood estimation according to the number of hits.

In yet another aspect, a computer-readable medium for storing instructions is provided. The instructions are executed by a system. The system includes a quantum computing unit and a classical computing unit. The quantum computing unit includes a manipulation unit that manipulates a quantum state, a state maintaining unit that maintains the quantum state, and a measurement unit that observes the quantum state. The classical computing unit performs post-processing based on output from the quantum computing unit. When executed by the system, the instructions perform a method. The method includes: obtaining, using the manipulation unit, a first operator that produces a superposition state of a plurality of random variables; producing, using the manipulation unit, a final quantum state by performing iteration of a first operation and a second operation on an initial quantum state using the state maintaining unit, the first operation producing a second state by performing a computation that inverts a first state with respect to a state obtained by applying a Hermitian conjugate of the first operator to a quantum state where the last bit of a bit string is 0, the second operation performing a computation that inverts the second state with respect to the first state, thereby producing a new first state; measuring, using the measurement unit, the bit string in the final quantum state; recording, using the measurement unit and in the classical computing unit, the number of hits that is the number of times a quantum state where all bits of the bit string are 0 is observed; and calculating, using the classical computing unit, the an expectation value of the random variables by maximum likelihood estimation according to the number of hits.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
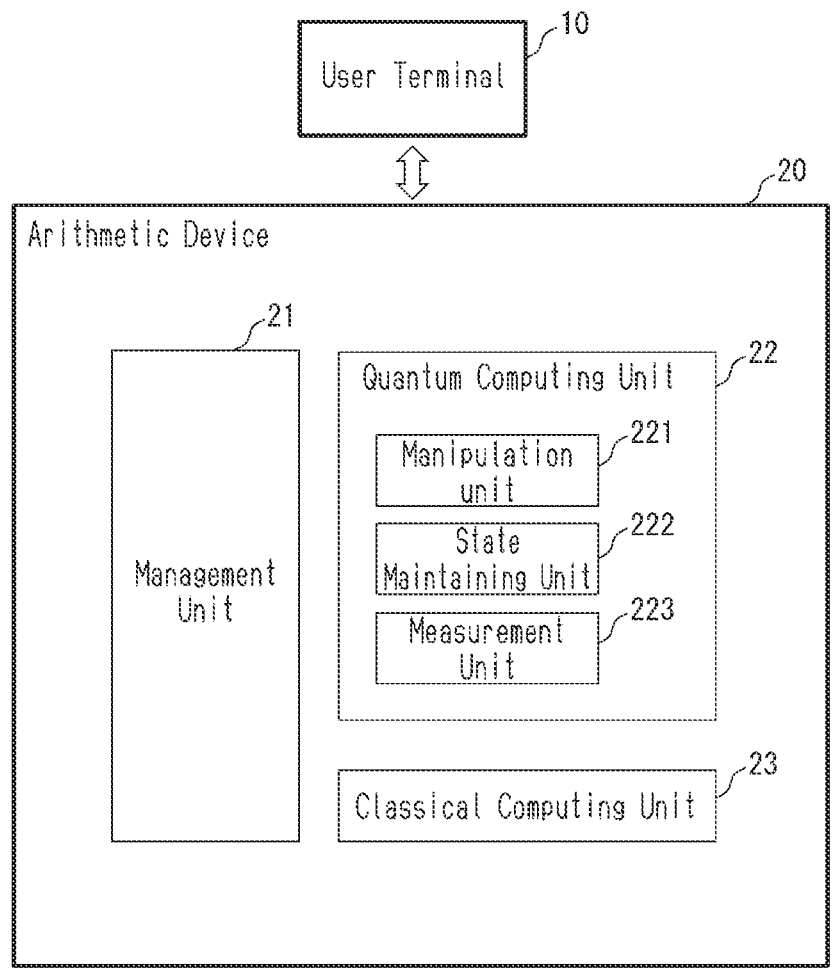
FIG. 1 is a schematic view of a system according to an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiments of the present technology may be directed to using a quantum computing device, alone or in conjunction with a classical computing device, to calculate expectation values. In particular, embodiments may calculate an expectation value of a function of a random variable on a quantum computing device with noise.

The goal of the expectation value calculation is to calculate an approximate value of the expectation value given by the following equation.

$$E_Q[g(x)] = \sum_{x=0}^{2^n-1} p(x)g(x) \quad \text{[Equation 1]}$$

where $2^n$ realizations of a random variable are considered, $p(x)$ is the probability density function that gives the probability of observing the value x of the random variable, and $g(x)$ is some function of the random variable.

In many cases, the Monte Carlo method is used to calculate such expectation value by a conventional computer. In the Monte Carlo computing, the expectation value is calculated by sampling the value x with the probability according to the probability density function $p(x)$. To calculate the expectation value with an accuracy of $\varepsilon$, generation of $N=O(1/\varepsilon^2)$ samples of the random variable is needed.

In contrast, to calculate the expectation value, quantum computing can achieve the same accuracy by repeating a computation $N=O(1/\varepsilon)$ times.

To calculate this equation with a quantum computer, an operator P ("first operator") is assumed that produces a superposition state of realizations of the random variable.

$$P|0^n\rangle = \sum_{x=0}^{2^n-1} \sqrt{p(x)}|x\rangle \quad \text{[Equation 2]}$$

where the state $|0^n\rangle$ is a state where all n qubit registers are 0. This state is an initial state of computing.

Then, one ancilla qubit is added to this state to assume an operator R for calculating a function $g(x)$ of the random variable as the amplitude of the ancilla qubit.

$$R|x\rangle|0\rangle = |x\rangle(\sqrt{1-g(x)}|0\rangle + \sqrt{g(x)}|1\rangle) \quad \text{[Equation 3]}$$

The operator P and operator R are combined into the following operator.

$$A = R(P \otimes I_1) \quad \text{[Equation 4]}$$

where $I_k$ is the identity operator for k bits, and $I_1$ represents an identity operator for one bit. The state $|\psi\rangle$ obtained by applying the operator A to the initial state $|0^n\rangle$ is defined as follows.

$$|\psi\rangle = A|0^n\rangle|0\rangle = \sum_{x=0}^{2^n-1} \sqrt{p(x)}|x\rangle(\sqrt{g(x)}|1\rangle + \sqrt{1-g(x)}|0\rangle) \quad \text{[Equation 5]}$$

Measuring the ancilla qubit obtains the expectation value (Equation 1) as the probability of observing $|1\rangle$.

$$\langle \psi|(I_n \otimes |1\rangle\langle 1|)|\psi\rangle = \sum_{x=0}^{2^n-1} p(x)g(x) = E_Q[g(x)] \quad \text{[Equation 6]}$$

When this state is repeatedly observed to estimate the expectation value from the number of times $|1\rangle$ is observed, the relationship between the number of iterations N and the estimation accuracy $\varepsilon$ of the expectation value is expressed as follows based on the law of large numbers.

$$N = O\left(\frac{1}{\varepsilon^2}\right) \quad \text{[Equation 7]}$$

This number of iterations required to achieve the accuracy c is the same as that in the Monte Carlo method of conventional computing devices.

A quantum algorithm can be used to reduce the number of iterations. This technique uses maximum likelihood estimation based on a combination of measurement data with different numbers of amplitude amplification operations generated using quantum circuits.

Figure 8:
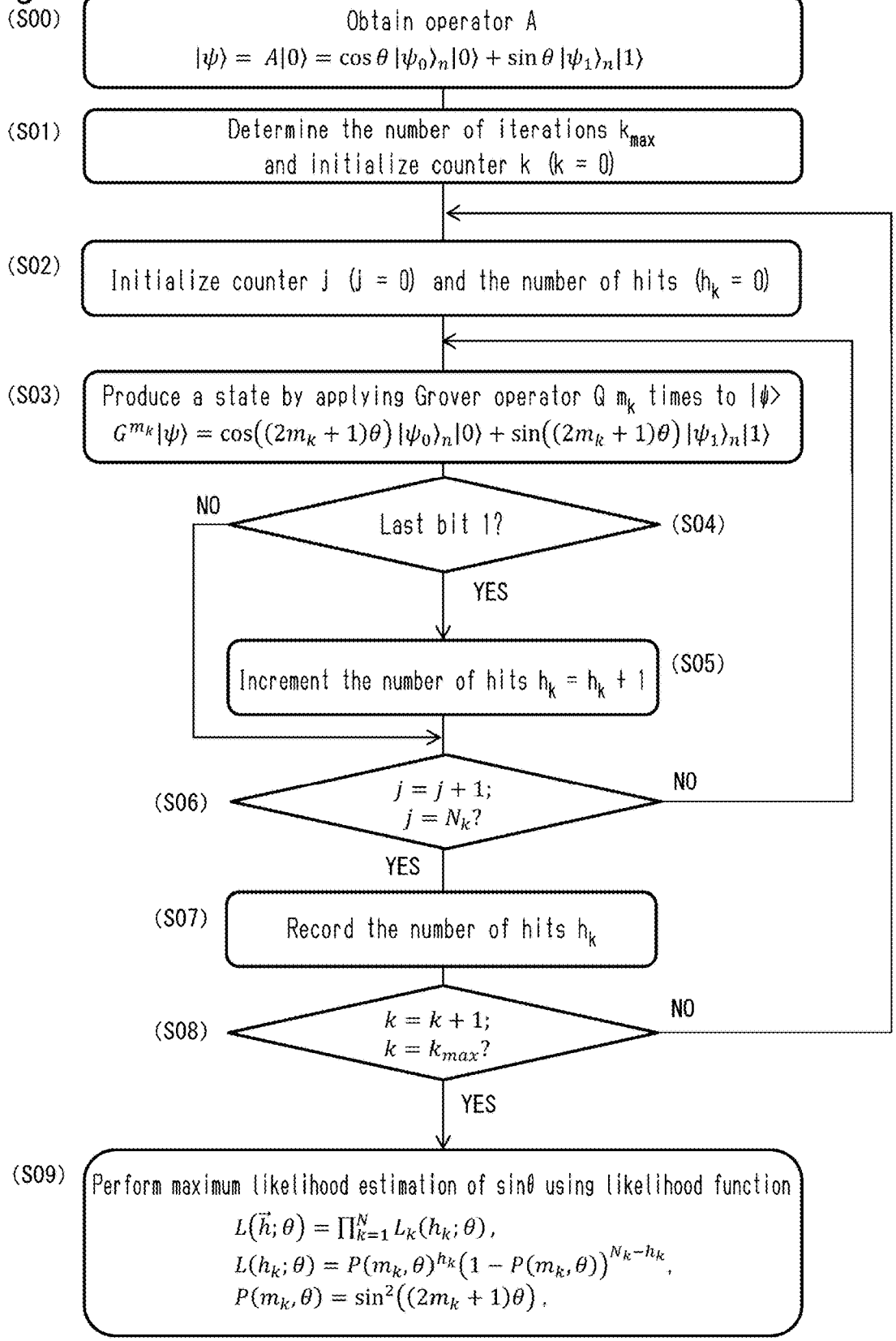
FIG. 8 is an explanatory diagram of a conventional procedure.

Referring to FIG. 8, a specific procedure of the quantum algorithm of this technique is now described.

First, the mathematical formula of Equation 5 is rewritten as follows (step S00).

$$|\psi\rangle = A|0^n\rangle|0\rangle = \cos\theta|\psi_0\rangle|0\rangle + \sin\theta|\psi_1\rangle|1\rangle \quad \text{[Equation 8]}$$

$$|\psi_0\rangle = \frac{1}{\cos\theta} \sum_{x=0}^{2^n-1} \sqrt{p(x)}\sqrt{1-g(x)}|x\rangle$$

$$|\psi_1\rangle = \frac{1}{\sin\theta} \sum_{x=0}^{2^n-1} \sqrt{p(x)}\sqrt{g(x)}|x\rangle$$

Then, the total number of iterations is determined (step S01). The total number of iterations $k_{max}\sim(1/\varepsilon)$ is set using the reciprocal of the required accuracy $\varepsilon$. $m_k$ and $N_k$ (k=0, 1, ... $k_{max}$) are variables that can be freely set by the user. For example, in this technique, $m_k$=FLOOR($2^{k-1}$) and $N_k$=100.

Then, a counter j is initialized (j=0), and the number of hits is initialized ($h_k$=0) (step S02).

A state is then produced by applying the Grover operator G $m_k$ times to $|\psi\rangle$ of Equation 8 (step S03).

This step uses the following Grover operator G:

$$G=AU_0A^\dagger U_f, \quad \text{[Equation 9]}$$

where $U_0$ is an operator that inverts the sign of the initial state $|0^{n+1}\rangle$, and $U_f$ is an operator that inverts the sign of $|\psi_0\rangle|0\rangle$, which are defined by the following equations.

$$U_0=-I_{n+1}+2|0^{n+1}\rangle\langle 0^{n+1}|$$

$$U_f=-I_{n+1}+2I_n\otimes|0\rangle\langle 0| \quad \text{[Equation 10]}$$

The Grover operator G is applied $m_k$ times to $|\psi\rangle$ of Equation 8 as shown below.

$$G^{m_k}|\psi\rangle = \cos((2m_k+1)\theta|\psi_0\rangle + \sin((2m_k+1)\theta|\psi_1\rangle|1\rangle \quad \text{[Equation 11]}$$

Figure 9:
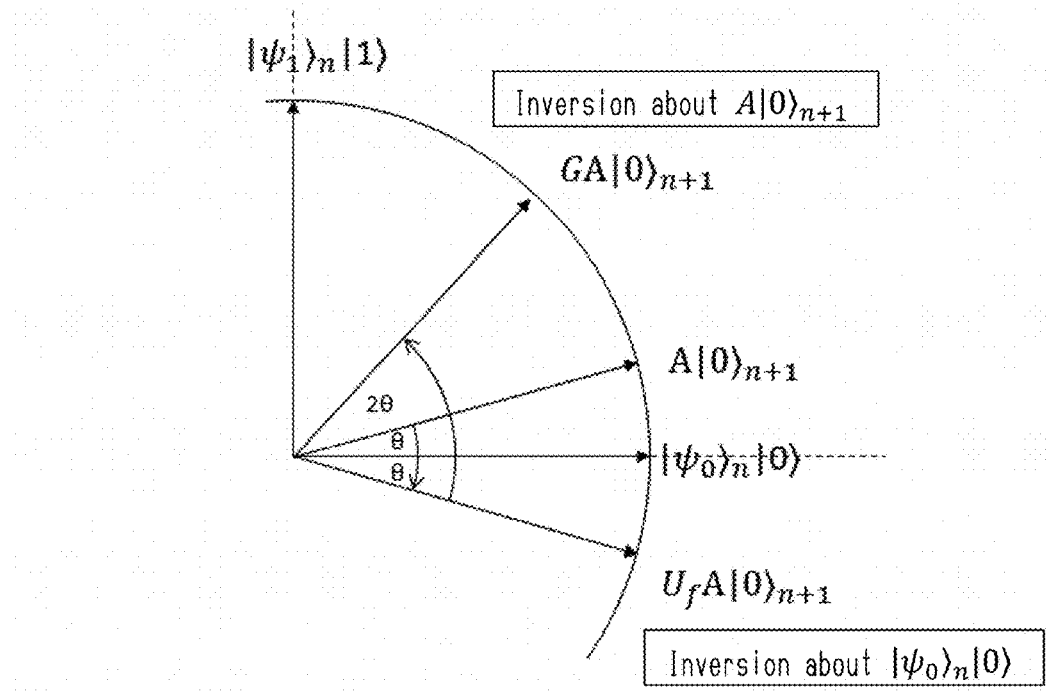
FIG. 9 is an explanatory diagram of conventional computing.

The amplitude amplification by the Grover operator G is outlined as follows. As shown in FIG. 9, in the Grover operator G, a computation of inverting the superposition state $|\psi\rangle$ of Equation 8 with respect to the basis $|\psi_0\rangle|0\rangle$ is performed to produce the first vector, and $\theta$ is amplified by performing a computation of inverting the first vector with respect to the superposition state $|\psi\rangle$.

Then, it is determined whether the last bit is 1 (step S04).

If the last bit is 1 ("YES" at step S04), the number of hits is incremented (step S05).

If the last bit is not 1 ("NO" at step S04), the increment of the number of hits (step S05) is skipped.

Then, 1 is added to the counter j, and it is determined whether the counter j has reached $N_k$ (step S06).

If the counter j has not reached $N_k$ ("NO" at step S06), the process from step S03 is repeated.

When the counter j reaches $N_k$ ("YES" at step S06), the number of hits $h_k$ is recorded (step S07).

Then, 1 is added to the number of iterations k, and it is determined whether the number of iterations k has reached the total number of iterations $k_{max}$ (step S08).

If the number of iterations k has not reached the total number of iterations $k_{max}$ ("NO" at step S08), the process from step S02 is repeated.

If the number of iterations k reaches the total number of iterations $k_{max}$ ("YES" at step S08), the maximum likelihood estimation of $\sin(\theta)$ is performed using the likelihood function of the following equation (step S09). That is, $\theta$ that maximizes the likelihood is determined.

$$L(\vec{h};\theta) = \prod_{k=1}^{k_{max}} L_k(h_k;\theta) \quad \text{[Equation 12]}$$

$$L_k(h_k;\theta) = P(m_k,\theta)^{h_k}(1-P(m_k,\theta))^{N_k-h_k}$$

$$P(m_k,\theta) = \sin^2((2m_k+1)\theta)$$

where $L_k$ is a partial likelihood function defined only using $h_k$ (the number of hits at the kth iteration), L is the whole likelihood function, and P is the probability density function that gives the probability of observing 1 for the ancilla qubit.

Quantum states are usually disturbed by the noise caused by the interaction between the system and the environment. However, the maximum likelihood estimation of conventional quantum-computing techniques does not consider the effects of noise.

A calculation performed considering the effects of noise is described below.

Assuming depolarization noise, the system is assumed to be exposed to the following depolarization noise during each operation.

$$\mathcal{D}(\rho) = r\rho + (1-r)\frac{I_{n+1}}{d}, \quad \text{[Equation 13]}$$

where $\rho$ is a density matrix, and r is a known constant representing the noise strength. This noise gives a random bit string with a probability of 1−r. $I_{n-1}$ is an identity operator in an n+1 qubit space. $d=2^{n+1}$ is the dimension of the n+1 qubit system.

Under the above depolarization noise, the density matrix of the state obtained by applying the Grover operator G $m_k$ times to the initial state $|\psi\rangle$ is as follows.

$$\rho G, r = r^{N_q}\rho G + \left(1-r^{N_q}\right)\frac{I_{n+1}}{d} \quad \text{[Equation 14]}$$

$$\rho G = \frac{(\cos(N_q\theta)|\psi_0\rangle|0\rangle + \sin(N_q\theta)|\psi_1\rangle|1\rangle)}{(\cos(N_q\theta)\langle\psi_0|\langle 0| + \sin(N_q\theta)\langle\psi_1|\langle 1|)}$$

where $N_q=2m_k+1$ is the number of queries of the operator A. The probability $p_{G,r}(0;\theta,N_q)$ of obtaining 0 and the probability $p_{G,r}(1;\theta,N_g)$ of obtaining 1 when the last bit is read from this state are expressed as:

$$p_{G,r}(0;\theta,N_q) = r^{N_q}\cos^2(N_q\theta) + \frac{1-r^{N_q}}{2}, \quad \text{[Equation 15]}$$

$$p_{G,r}(1;\theta,N_q) = r^{N_q}\sin^2(N_q\theta) + \frac{1-r^{N_q}}{2}.$$

Thus, under depolarization noise, the likelihood function of Equation 12 is changed as follows, and maximum likelihood estimation can be performed using this likelihood function.

$$L(\vec{h};\theta) = \prod_{k=1}^{k_{max}} L_k(h_k;\theta)$$ [Equation 16]

$$L_k(h_k;\theta) = P(N_q,\theta)^{h_k}(1-P(N_q,\theta))^{N_k-h_k}$$

$$P(N_q,\theta) = r^{N_q}\sin^2(2N_q\theta) + \frac{1-r^{N_q}}{2}$$

In a general sense, with a probability model including an unknown population parameter θ, the lower limit of the estimation accuracy in estimating θ from $N_k$ measurement results is given as follows using the Fisher information F.

$$\mathbb{E}\left[(\hat{\theta}-\theta)^2\right] \geq \frac{1}{N_k F}$$ [Equation 17]

where E[•] is the expectation value under the probability model, and the circumflex accent θ is an unbiased estimator of θ obtained from the measurement results. When the number of measurements $N_k$ is sufficiently large, maximum likelihood estimation is known to substantially achieve the lower limit of the above inequality. For this reason, the Fisher information is used to evaluate the performance of the technique as follows.

The Fisher information $F_{c,G,r}(\theta,N_q)$ related to the probability distribution Equation 15 can be expressed as follows.

$$F_{c,G,r}(\theta,N_q) = \frac{4N_q^2\sin^2(N_q\theta)\cos^2(N_q\theta)T^{2N_q}}{\left(\frac{1}{2}+\left(\cos^2(N_q\theta)-\frac{1}{2}\right)r^{N_q}\right)\left(\frac{1}{2}+\left(\sin^2(N_q\theta)-\frac{1}{2}\right)r^{N_q}\right)}$$ [Equation 18]

This Fisher information has the following upper envelope.

$$F_{e,G,r}(N_q)|_{env} = 4N_q^2 r^{2N_q},$$ [Equation 19]

Figure 10:
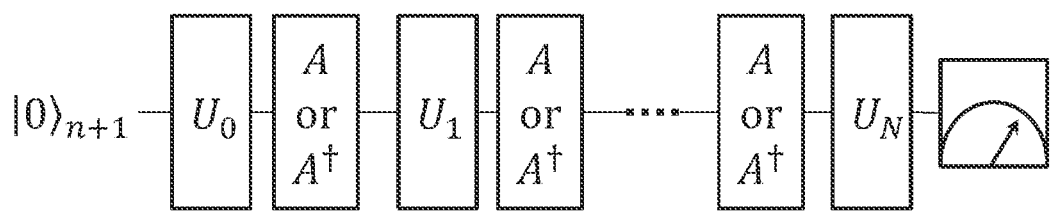
FIG. 10 is an explanatory diagram of computing using an operator A.

As shown in FIG. 10, the upper limit $F_u(N_q)$ of the Fisher information obtained from a computation using the operator A is given as follows.

$$F_u(N_q) = \frac{4N_q^2 r^{2N_q}}{\frac{2}{d}+\left(1-\frac{2}{d}\right)r^{N_q}}$$ [Equation 20]

Figure 11:
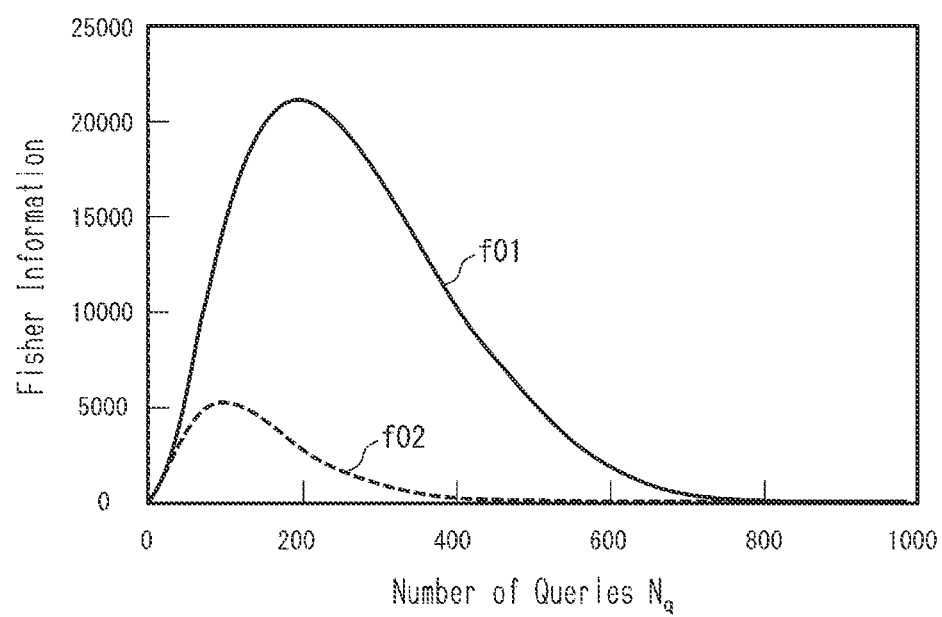
FIG. 11 is an explanatory diagram showing the divergence in Fisher information between an existing technique and the theoretical limit.

FIG. 11 shows a comparison between Equation 19 and Equation 20 (where r=0.99 and n=10). Curve f01 is the theoretical upper limit of the Fisher information of Equation 19, and Curve f02 is the Fisher information given by Equation 20. FIG. 11 illustrates a large divergence between the two. It is an important task to provide a specific technique that achieves performance capabilities as close as possible to the theoretical upper limit of Equation 20 for a quantum computing device with noise.

Referring to FIGS. 1 to 7C, an embodiment of a system and a method for calculating an expectation value is now described. The present embodiment calculates an expectation value of a function of a random variable.

As shown in FIG. 1, the present embodiment uses a user terminal 10 and an arithmetic device 20 connected by a network.

[Hardware Configuration]

Figure 2:
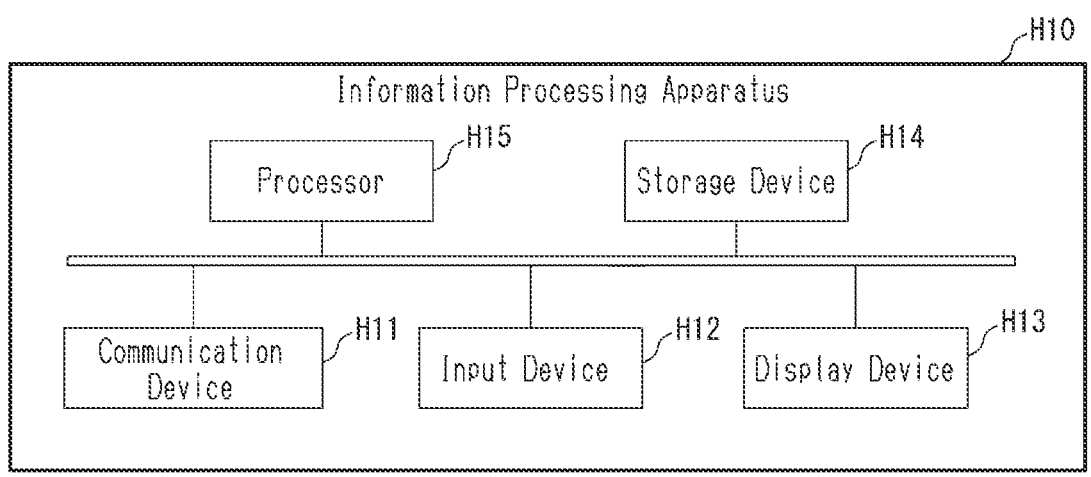
FIG. 2 is an explanatory diagram of a hardware configuration of the embodiment.
Figure 3:
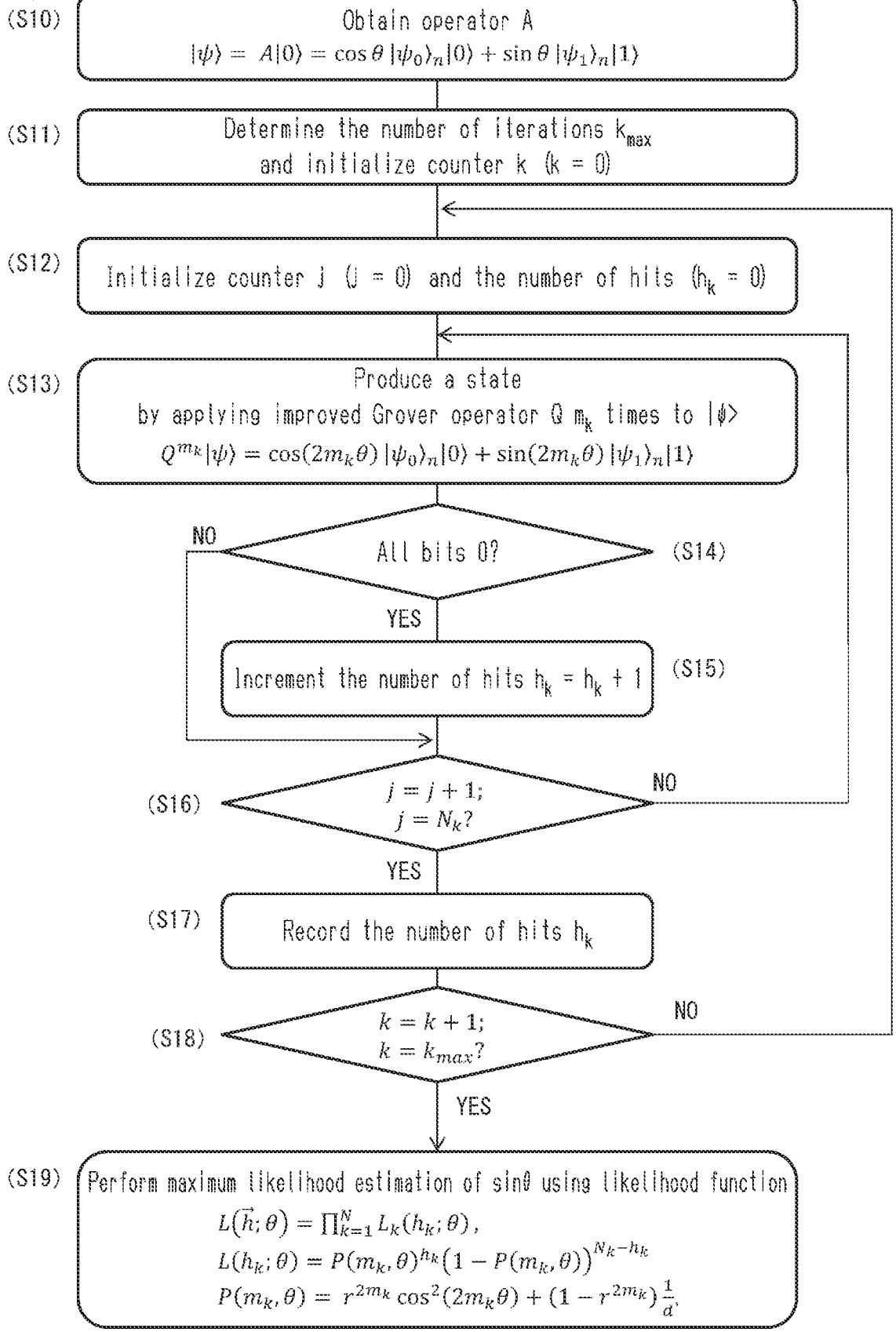
FIG. 3 is an explanatory diagram of a procedure of the embodiment.

Referring to FIG. 2, the hardware configuration of an information processing apparatus H10 serving as the user terminal 10 and the classical computer portion of the arithmetic device 20 is now described. The information processing apparatus H10 includes a communication device H11, an input device H12, a display device H13, a storage device H14, and a processor H15. This hardware configuration is an example, and the user terminal 10 and the arithmetic device 20 may be other hardware.

The communication device H11 is an interface, such as a network interface or a wireless interface, that establishes communication paths with other devices and performs data transmission and reception.

The input device H12 receives input from a user or the like and may be a mouse or a keyboard, for example. The display device H13 is a display or the like that displays various types of information.

The storage device H14 stores data and various programs for executing various functions of the user terminal 10 and the arithmetic device 20. Examples of the storage device H14 include ROM, RAM, and a hard disk.

The processor H15 controls processes of the user terminal 10 and the arithmetic device 20 using programs and data stored in the storage device H14. Examples of the processor H15 include a CPU and an MPU. The processor H15 loads the programs stored in the ROM into the RAM and executes various processes for services.

The processor H15 is not limited to a system that performs software processing for all processes performed by the processor H15. For example, the processor H15 may include a dedicated hardware circuit, such as an application-specific integrated circuit, that performs hardware processing for at least some of the processes performed by the processor H15. That is, the processor H15 may be configured as circuitry that includes: (1) at least one processor that operates according to a computer program; (2) at least one dedicated hardware circuit that performs at least a part of various processes; or (3) a combination of (1) and (2). The processor includes a CPU and memory, such as RAM and ROM, which stores program codes or instructions that enable the CPU to perform processes. The memory, or the computer-readable medium, may be any available medium that can be accessed by a computing device, such as a dedicated computer.

[System Configuration]

Referring to FIG. 1, the system configuration of the user terminal 10 and the arithmetic device 20 is now described.

The user terminal 10 is a computer terminal used by a user.

The arithmetic device 20 is a computer for performing amplitude estimation.

The arithmetic device 20 performs the processes described below (various processes in stages including a management stage, a quantum computing stage, and a classical computing stage). The arithmetic device 20 executes programs for the above purposes and thus functions as a management unit 21, a quantum computing unit 22, and a classical computing unit 23.

The management unit 21 manages quantum computing and classical computing.

The quantum computing unit 22 performs quantum computing. In this embodiment, the quantum computing unit 22 executes an amplitude amplification algorithm. The quantum computing unit 22 includes a manipulation unit 221, a state maintaining unit 222, and a measurement unit 223.

The manipulation unit 221 performs quantum manipulation according to quantum operations for manipulating the qubits of the state maintaining unit. In this case, the manipulation unit 221 manipulates (produces) a state held by the state maintaining unit 222 using quantum circuits such as quantum gates, and manipulates the magnetic or photon paths (circuits) to manipulate (create) a state held by the state maintaining unit 222.

The state maintaining unit 222 includes multiple qubits and maintains a quantum state. The qubits may be electron levels, electron spins, ion levels, nuclear spins, or photons, which maintain a superposition state of multiple values in a physical state. The qubits are not limited to the above as long as they can maintain superposition states.

The measurement unit 223 observes the eigenstate of superposition state of the quantum bits in the state maintaining unit 222. The measurement unit 223 records the number of hits according to the state of the qubits of the state maintaining unit 222. Then, the measurement unit 223 outputs the observed value to the classical computing unit 23 via the management unit 21.

The classical computing unit 23 performs classical computing. The present embodiment executes a maximum likelihood estimation algorithm to estimate the amplitude of the state $|1\rangle$ of the ancilla qubit below and calculate the expectation value (Equation 5 is rewritten below).

$$|\psi\rangle = A|0^n\rangle|0\rangle \quad \text{[Equation 21]}$$

$$= \sum_{x=0}^{2^n-1} \sqrt{p(x)}|x\rangle(\sqrt{g(x)}|1\rangle\sqrt{1-g(x)}|0\rangle)$$

In the following procedure, an amplitude amplification algorithm is used for quantum computing, and the classical computer is used for the other parts.

First, the management unit 21 obtains an operator A from the user terminal 10 (step S10). This operator A ("first operator") is determined by a function according to the type of the expectation value. Then, the manipulation unit 221 of the quantum computing unit 22 produces the following state $|\psi\rangle$.

$$|\psi\rangle = A|0\rangle = \cos\theta|\psi_0\rangle_n|0\rangle + \sin\theta|\psi_1\rangle_n|1\rangle \quad \text{[Equation 22]}$$

In this case, the manipulation unit 221 determines the total number of iterations $k_{max}$ (step S11). The manipulation unit 221 calculates the total number of iterations $k_{max}=O(1/\varepsilon)$ according to the required accuracy E obtained from the user terminal 10.

The manipulation unit 221 then initializes a counter j (j=0) and initializes the number of hits $h_k$ ($h_k$=0) (step S12).

Then, the quantum computing unit 22 prepares a state by applying an improved Grover operator Q to the state $|\psi\rangle$ in the state maintaining unit 222 $m_k$ times (step S13).

This step uses the improved Grover operator Q expressed by the following equation with the operator A and the Hermitian conjugate of the operator A.

$$Q = U_0 A^\dagger U_f A$$

$$U_0 = -I_{n+1} + 2|0\rangle_{n+1}\langle 0|_{n+1},$$

$$U_f = -I_{n+1} + 2I_c \otimes |0\rangle\langle 0|. \quad \text{[Equation 23]}$$

The Grover operator G performs a rotation between $|\psi_0\rangle_n|0\rangle$ and $|\psi_1\rangle_n|1\rangle$ (or between $A|0\rangle_{n+1}$ and $A^\dagger|\psi_0\rangle_n|0\rangle$).

In contrast, the improved Grover operator Q performs a rotation between $|0\rangle_{n+1}$ and $A^\dagger|\psi_0\rangle_n|0\rangle$.

In this case, the state $|\psi_Q(\theta,N_q)\rangle$ obtained by applying the improved Grover operator Q $m_k$ times to the initial state $|0\rangle_{n+1}$ is as follows.

$$|\psi_Q(\theta, N_q)\rangle := Q^m|0\rangle_{n+1} = \cos(N_q\theta)|0\rangle_{n+1} + \sin(N_q\theta)|\phi\rangle_{n+1}, \quad \text{[Equation 24]}$$

$$|\phi\rangle_{n+1} = A^\dagger(-\sin\theta|\psi_0\rangle_n|0\rangle + \cos\theta|\psi_1\rangle_n|1\rangle)$$

$$= \frac{1}{\sin 2\theta}(Q - \cos 2\theta)\Big|_{n+1}.$$

The outline of the amplitude amplification by the improved Grover operator Q is shown below.

Figure 4:
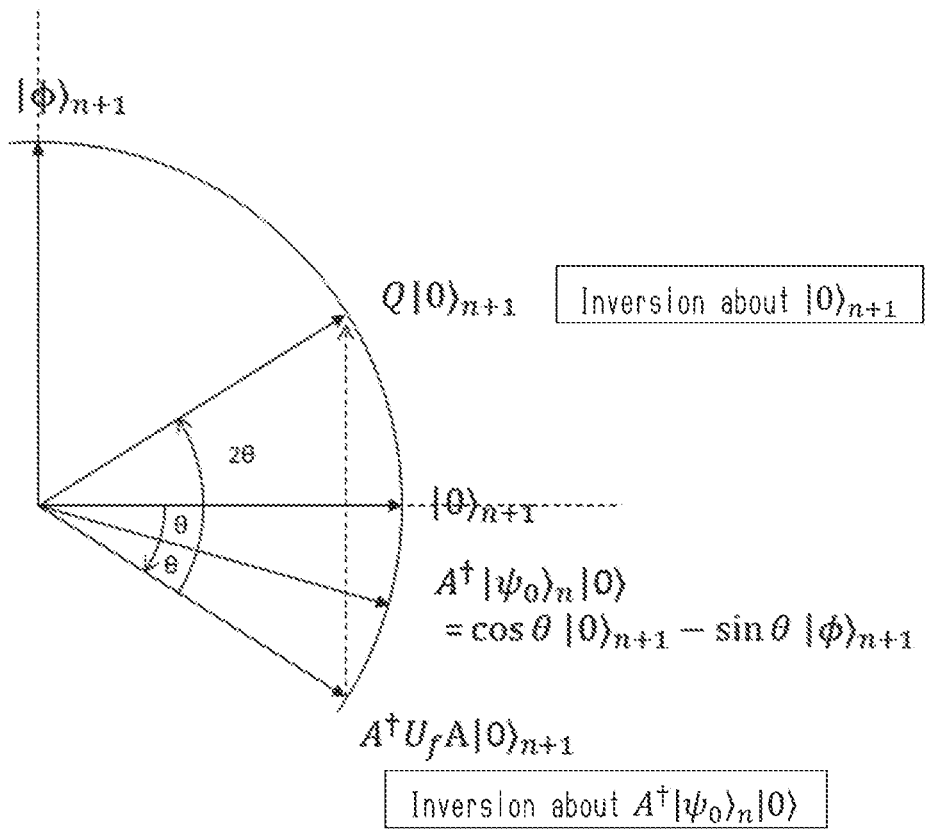
FIG. 4 is an explanatory diagram of computing of the embodiment.

As shown in FIG. 4, the improved Grover operator Q first inverts the computational basis $|0\rangle_{n+1}$, where all n+1 bits are in the 0 state, with respect to the following state.

$$A^\dagger|\psi_0\rangle_n|0\rangle = \cos\theta|0\rangle_{n+1} - \sin\theta|\phi\rangle_{n+1} \quad \text{[Equation 25]}$$

This obtains the second state $A^\dagger U_f|0\rangle_{n+1}$. Here, $|\psi\rangle_{n+1}$ is a state other than the state where all bits are 0.

A computation of inverting this second state with respect to the initial state $|0\rangle_{n+1}$ is performed to generate a third state $Q|0\rangle_{n+1}$.

Equation 24 is obtained by repeating the action of the improved Grover operator Q $m_k$ times.

Then, the measurement unit 223 of the quantum computing unit 22 determines whether all the bits are 0 in the state maintaining unit 222 (step S14).

When the measurement unit 223 determines that all bits are 0 ("YES" at step S14) in the state maintaining unit 222, the manipulation unit 221 increments the number of hits (step S15). Specifically, the manipulation unit 221 adds 1 to the number of hits $h_k$.

When not all bits are 0 ("NO" at step S14) in the state maintaining unit 222, the measurement unit 223 skips the incrementing of the number of hits (step S15).

Then, the manipulation unit 221 adds 1 to the counter j and determines whether the counter j has reached $N_k$ (step S16).

If the counter j has not reached $N_k$ ("NO" at step S16), the manipulation unit 221 repeats the process from step S13.

If the counter j has reached $N_k$ ("YES" at step S16), the manipulation unit 221 records the number of hits $h_k$ (step S17). Specifically, the manipulation unit 221 records the number of hits $h_k$ in the classical computing unit 23.

Then, the manipulation unit 221 adds 1 to the number of iterations k and determines whether the number of iterations k has reached the total number of iterations $k_{max}$ (step S18).

If the number of iterations k has not reached the total number of iterations $k_{max}$ ("NO" at step S18), the manipulation unit 221 repeats the process from step S12.

If the number of iterations k has reached the total number of iterations $k_{max}$ ("YES" at step S18), the classical computing unit 23 performs maximum likelihood estimation of $\sin\theta$ using the likelihood function of the following equation (Step S19). Specifically, the classical computing unit 23 calculates $\theta$ that maximizes the likelihood.

$$L(\vec{h};\theta) = \prod_{k=1}^{N} L_k(h_k;\theta),$$ [Equation 26]

$$L(h_k;\theta) = P(m_k,\theta)^{h_k}(1-P(m_k,\theta))^{N_k-h_k}$$

$$P(m_k,\theta) = r^{2m_k}\cos^2(2m_k\theta) + (1-r^{2m_k})\frac{1}{d},$$

The present technique uses the above algorithm.

The performance evaluation of this technique is shown below, indicating that the technique achieves performance that surpasses existing techniques and is also significantly close to the theoretical limit.

The density matrix of the state obtained by applying the improved Grover operator Q $m_k$ times to the initial state under noise conditions is given by:

$$\rho_{Q,r}(\theta, N_q) = r^{N_q}\rho_Q(\theta,N_q) + (1-r^{N_q})\frac{I_{n+1}}{d},$$ [Equation 27]

$$\rho_Q(\theta, N_q) = |\psi_Q(\theta,N_q)\rangle\langle\psi_Q(\theta,N_q)|.$$

where $N_q=2m_k$ is the number of queries of the operator A. The probability distribution obtained when all bits are read from this state can be expressed as follows:

$$p_{Q,r}(0;\theta,N_q) = r^{N_q}\cos^2(N_q\theta) + (1-r^{N_q})\frac{1}{d},$$ [Equation 28]

$$p_{Q,r}(1;\theta,N_q) = r^{N_q}\sin^2(N_q\theta) + (1-r^{N_q})\frac{d-1}{d}.$$

where $p_{Q,r}(0;\theta,N_q)$ represents the probability that a bit string in which all bits are 0 is obtained, and $p_{Q,r}(1;\theta,N_q)$ represents the probability that other bit string is obtained.

Intuitively, the present embodiment is expected to achieve the following advantageous effects.

(1) With the Grover operator of the existing technique, θ is assessed by mapping with respect to the basis $|\psi_0\rangle|0\rangle$, and the state of the high-order bits is unknown. Thus, noise information can be obtained only from the last bit. This may hinder noise suppression. In contrast, according to the present embodiment, all bit strings in the initial state $|0\rangle_{n+1}$ and the basis are known. It is thus possible to obtain noise information by observing all bits, increasing the possibility of further suppression.

As a result, the second term of $p(m_k)=p_{Q,r}(0;\theta,N_q)$ in Equation 28 is $1/d=\frac{1}{2^n}$, thereby reducing the noise exponentially with respect to the number of bits n.

The actual superiority of this embodiment is now described from the viewpoint of Fisher information. The Fisher information related to the probability distribution of Equation 28 can be expressed as follows.

$$F_{c,Q,r}(\theta,N_q) = \frac{4N_q^2\sin^2(N_q\theta)\cos^2(N_q\theta)r^{2N_q}}{\left(\frac{1}{d}+\left(\cos^2(N_q\theta)-\frac{1}{d}\right)r^{N_q}\right)\left(\frac{d-1}{d}+\left(\sin^2(N_q\theta)-\frac{d-1}{d}\right)r^{N_q}\right)}$$ [Equation 29]

This Fisher information has the following upper envelope $F_{c,Q,r}(N_q)|_{env}$.

$$F_{c,Q,r}(N_q)|_{env} = 4N_q^2r^{N_q} + 8N_q^2\frac{d-1}{d^2}(1-r^{N_q})^2 -$$

$$\frac{8N_q^2(1-r^{N_q})\sqrt{(d-1)(d-1+r^{N_q})((d-1)r^{N_q}+1)}}{d^2} \geq$$

$$4N_q^2r^{N_q} + 8N_q^2\frac{d-1}{d^2}(1-r^{N_q})^2 -$$

$$\frac{8N_q^2(1-r^{N_q})}{d^2}\left\{\frac{(d-1)(d-1+r^{N_q})((d-1)r^{N_q}+1)}{2}\right\} =$$

$$4N_q^2r^{N_q} = F_{c,Q,r}(N_q)|_{env}$$

[Equation 30]

Figure 5A:
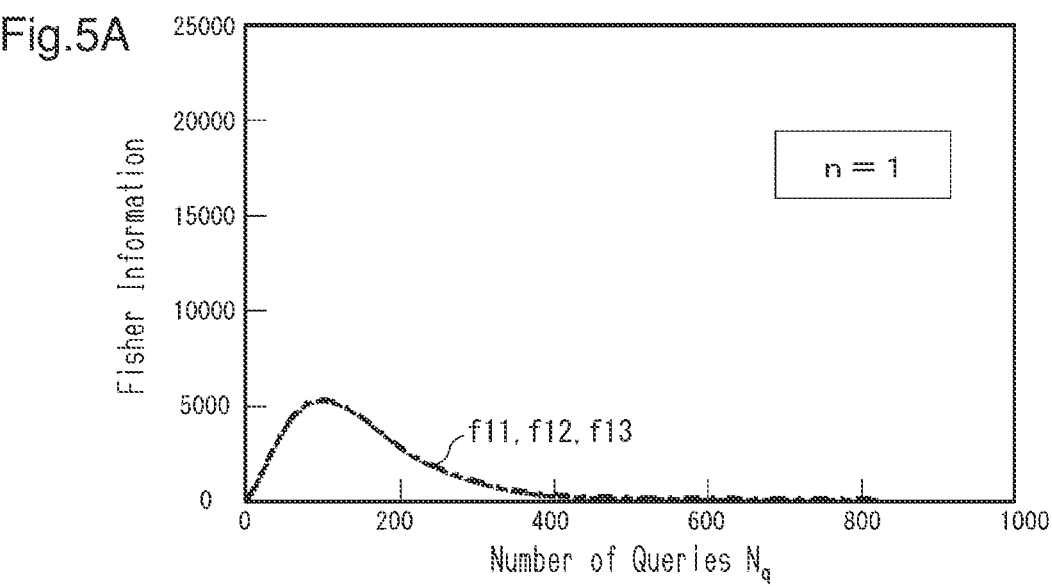
FIGS. 5A, 5B, and 5C are explanatory diagrams of the Fisher information of the present embodiment for n=1, n=10, and n=100, respectively.
Figure 5B:
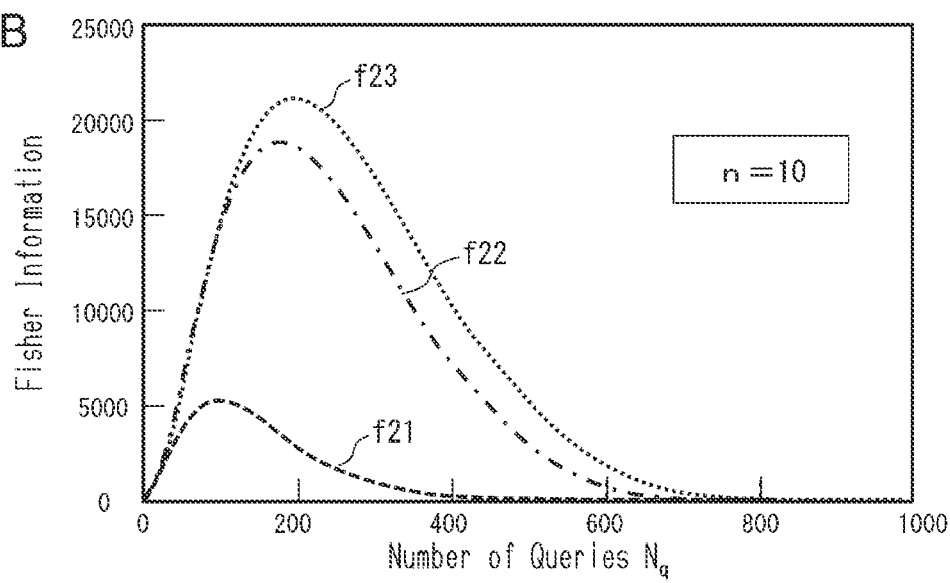
Figure 5C:
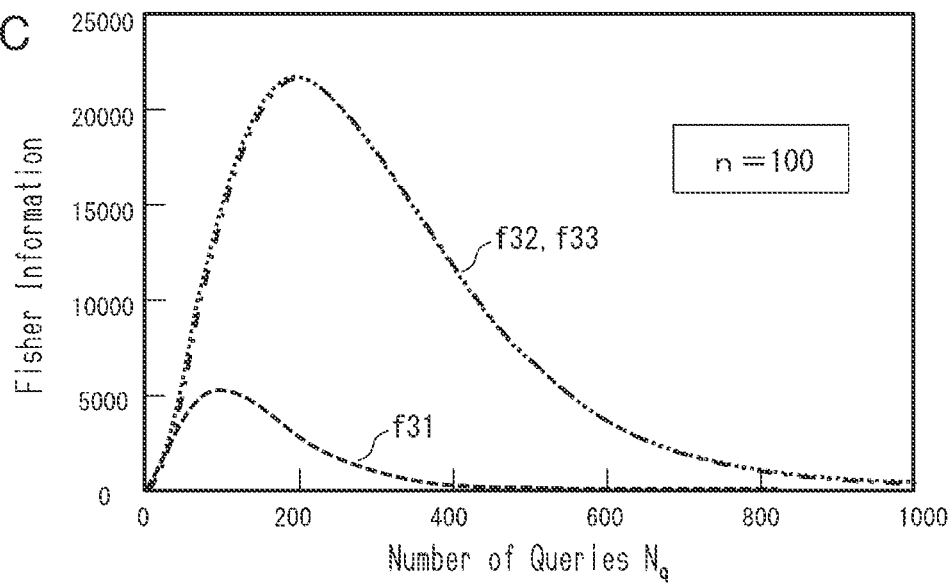
Figure 6A:
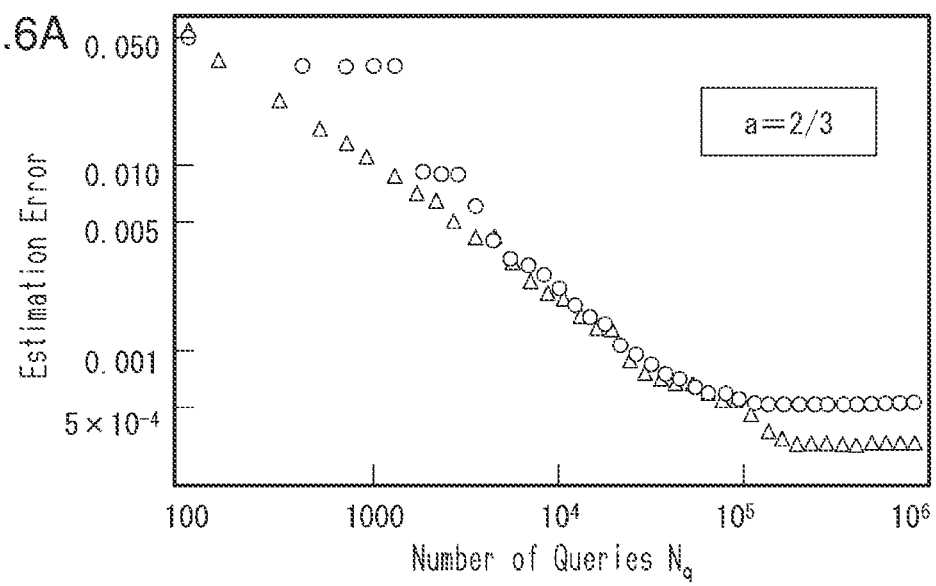
FIGS. 6A, 6B, and 6C are explanatory diagrams of numerical simulation results of the estimation error of the present embodiment for the true target value=2/3, the true target value=1/3, and the true target value=1/6, respectively.
Figure 6B:
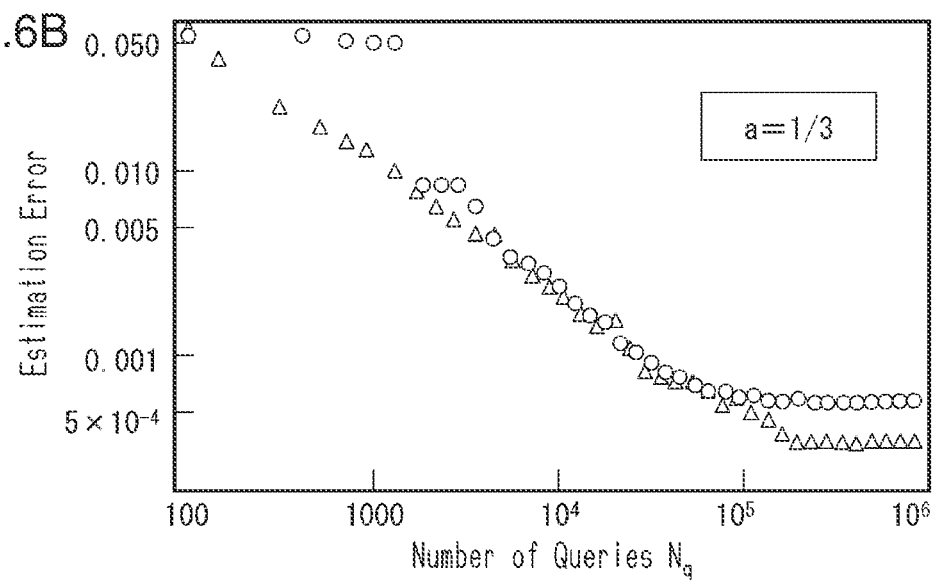
Figure 6C:
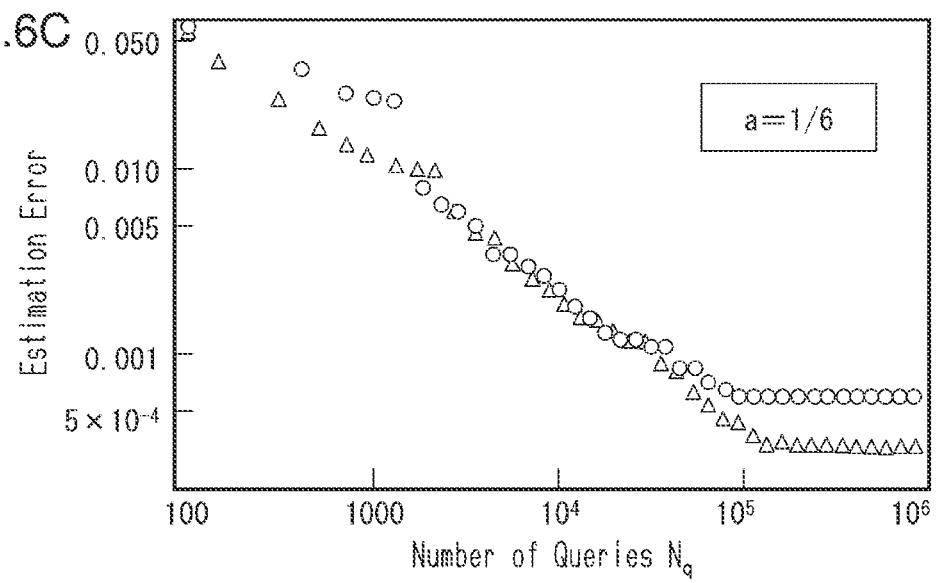
Figure 7A:
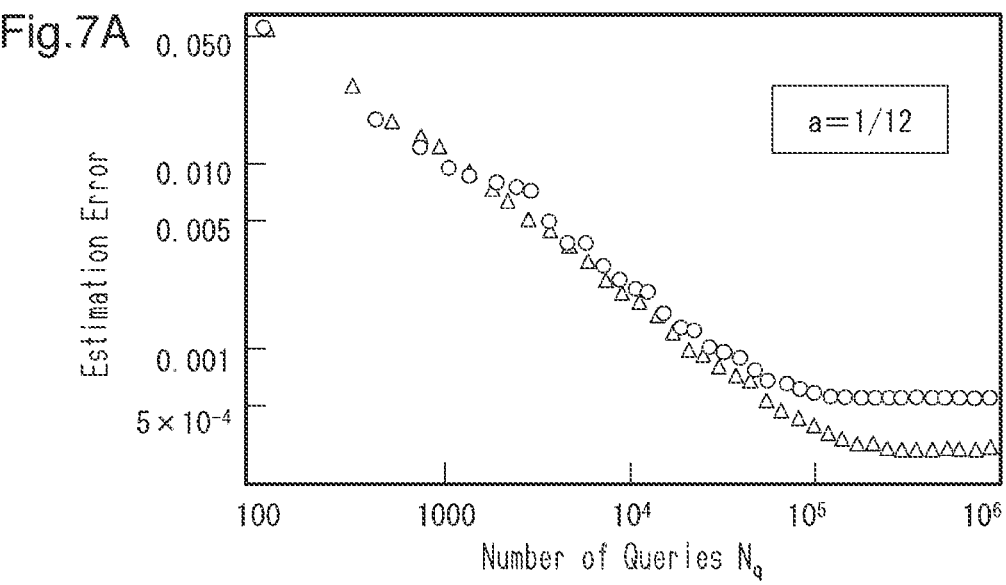
FIGS. 7A, 7B, and 7C are explanatory diagrams of numerical simulation results of the estimation error of the present embodiment for the true target value=1/12, the true target value=1/24, and the true target value=1/48, respectively.
Figure 7B:
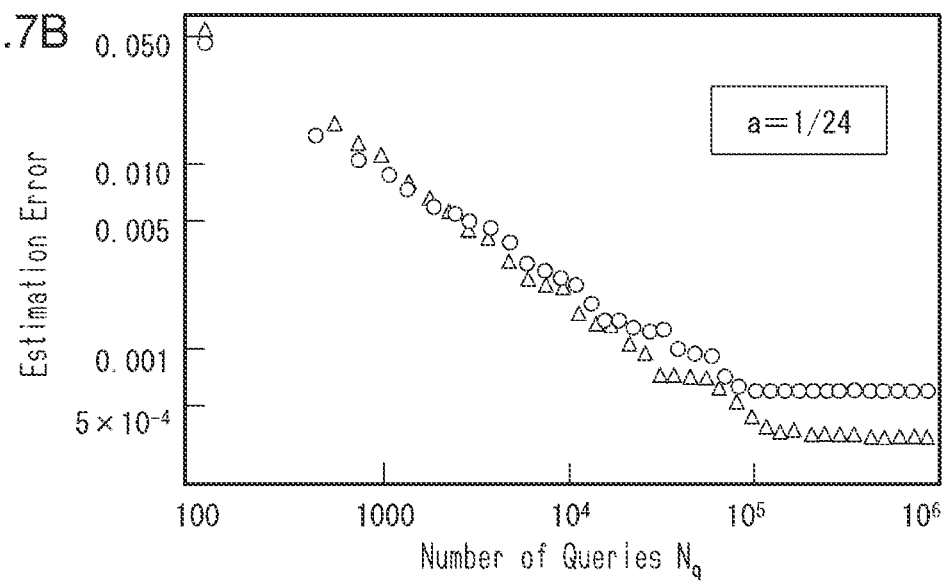
Figure 7C:
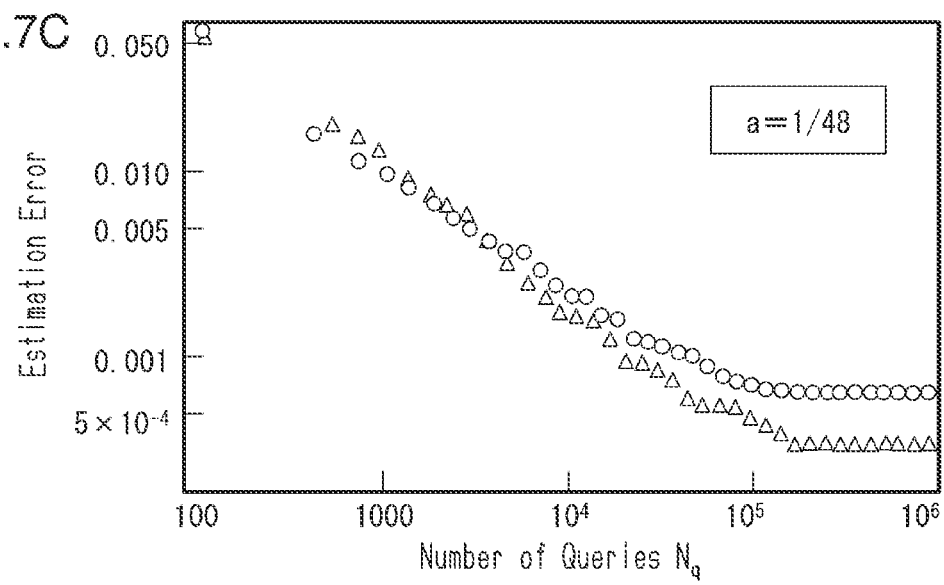

FIGS. 5A to 5C each show the relationship between the number of queries and the following Fisher information.

Envelopes of the Fisher information of the Grover operator G of the existing technique of Equation 19: f11, f21, f31

Envelopes of the Fisher information of the improved Grover operator Q of Equation 30 ($F_{c,G,r}(N_q)|_{env}$ and $F_{c,Q,r}(N_q)|_{env}$): f12, f22, f32

Theoretical upper limit of the Fisher information of Equation 21 ($F_u(N_q)$): f13, f23, f33

As shown in FIG. 5A, when n=1 (i.e., d=2), the envelope curve f11 of the Fisher information of the Grover operator G, the envelope curve f12 of the Fisher information of the improved Grover operator Q, and the theoretical upper limit f13 of the Fisher information are substantially the same.

FIG. 5B shows the case where n=10 (i.e., $d=2^{10}$), and FIG. 5C shows the case where n=100 (i.e., $d=2^{100}$). As shown in FIG. 5B, the Fisher information of the improved Grover operator Q indicated by the envelope curve f22 is greater than the Fisher information of the Grover operator G indicated by the envelope curve f21, and is closer to the theoretical upper limit f23 of the Fisher information. The Fisher information ($F_{c,G,r}(N_q)|_{env}$) of the present embodiment agrees with the theoretical upper limit ($F_u$) at the limit where the number of bits is large. Specifically, as shown in FIG. 5C, the envelope curve f32 of the Fisher information of the improved Grover operator Q almost reaches the theoretical upper limit f33 of the Fisher information even with a relatively small number of bits, such as 100 bits. The curve f31 indicates the envelope of the Fisher information of the Grover operator G.

This shows that the use of the improved Grover operator Q increases the Fisher information than when the Grover operator G is used.

The above discussion concerns the Fisher information envelope, but the practical effectiveness of the present technique can also be confirmed by performing numerical simulations on various θ.

FIGS. 6A to 6C and 7A to 7C show the results of numerical simulations, with the number of queries $N_q$ of the operator A on the horizontal axis and the estimation error of θ on the vertical axis. FIGS. 6A to 6C and 7A to 7C show simulations with different target values ($a=\sin^2\theta$). The target values are a=⅔ in FIG. 6A, a=⅓ in FIG. 6B, and a=⅙ in FIG. 6C. The target values are a=1/12 in FIG. 7A, a=1/24 in FIG. 7B, and a=1/48 in FIG. 7C. The circle and triangle symbols indicate the results of numerical simulations with the existing technique and the technique of the present embodiment, respectively. It can be seen that when the number of queries $N_q$ is large, the accuracy of the present embodiment is higher by several times (2 to 3 times).

(2) According to the present embodiment, to calculate the amplitude of the state |1⟩ (expectation value), the computation results of the quantum computing unit 22 are subjected to maximum likelihood estimation by the classical computing unit 23. This reduces the performance capability required for the quantum computer used for quantum computing.

This embodiment can be modified and implemented as follows. The embodiments and the following modifications may be combined to the extent that does not cause technical contradiction.

In a particular embodiment, the improved Grover operator described above may be used to calculate the price of a financial derivative. For example, a price of a financial derivative, such as an option price, can be calculated with the expectation value. In the embodiments for calculating the option price, the realizations of the random variable are a number of scenarios (Scenario$_1$, Scenario$_2$, ... Scenario$_N$). The expectation value is calculated based on those scenarios In a particular non-limiting embodiment (calculation of an option price for a European call option), the option price C can be calculated by the following equation using an expectation value $E_Q$.

$$C = e^{-rT} E_Q[f(S(T))] \quad \text{[Equation 31]}$$

where r is the risk-free rate, T is the time until the maturity date, f(•) is the payoff function, and S(T) is the underlying asset price at the maturity.

While disclosed as being useable to calculate the price of a financial derivative, it will be appreciated that the application scope of the present disclosure is not so limited. For example, the present disclosure is also applicable to the computing of values at risk (VAR), which is an asset risk assessment index, in a price fluctuation model including multiple scenarios. Additionally, it can be widely applied not only to finance but also to calculation using the Monte Carlo method, which is calculated using random numbers.

In the above embodiment, quantum computing and classical computing are used together. All procedures may also be performed only by a quantum computer.

In the above embodiment, the system may calculate an expectation value of the result obtained by applying a payoff function according to the derivative to the underlying asset price as the price assessment of the financial instrument.

In the above embodiment, the system may calculate an asset risk assessment index as price assessment of the financial instrument.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A system comprising:
   a quantum computing unit including a manipulation unit that manipulates a quantum state, a state maintaining unit that maintains the quantum state, and a measurement unit that observes the quantum state; and
   a classical computing unit that performs post-processing based on output from the quantum computing unit, wherein the system is configured to:
   by the manipulation unit, obtain a first operator that produces a superposition state of a plurality of random variables,
   by the manipulation unit, perform iteration of a first operation and a second operation on an initial quantum state using the state maintaining unit to produce a final quantum state, the first operation producing a second state by performing a computation that inverts a first state with respect to a state obtained by applying a Hermitian conjugate of the first operator to a quantum state where a last bit of a bit string is 0, the second operation performing a computation that inverts the second state with respect to the first state, thereby producing a new first state,
   by the measurement unit, measure the bit string in the final quantum state,
   by the measurement unit, record, in the classical computing unit, a number of hits that is a number of times a quantum state where all bits of the bit string are 0 is observed, and
   by the classical computing unit, calculate an expectation value of the random variables by maximum likelihood estimation according to the number of hits.

2. The system according to claim 1, wherein the manipulation unit is configured to perform the iteration a number of times corresponding to a reciprocal of an accuracy required in measurement of the bit string.

3. The system according to claim 1, wherein the classical computing unit is configured to perform maximum likelihood estimation of amplitude through classical computing based on the number of hits and assess the expectation value.

4. A method executed by a system, wherein
   the system includes:
   a quantum computing unit including a manipulation unit that manipulates a quantum state, a state maintaining unit that maintains the quantum state, and a measurement unit that observes the quantum state; and
   a classical computing unit that performs post-processing based on output from the quantum computing unit,
   the method comprises:
   obtaining, by the manipulation unit, a first operator that produces a superposition state of a plurality of random variables;
   performing, by the manipulation unit, iteration of a first operation and a second operation on an initial quantum state using the state maintaining unit to produce a final quantum state, the first operation producing a second state by performing a computation that inverts a first state with respect to a state obtained by applying a Hermitian conjugate of the first operator to a quantum state where a last bit of a bit string is 0, the second operation performing a computation that inverts the second state with respect to the first state, thereby producing a new first state;
   measuring, by the measurement unit, the bit string in the final quantum state;
   recording, by the measurement unit and in the classical computing unit, a number of hits that is a number of times a quantum state where all bits of the bit string are 0 is observed; and calculating, by the classical computing unit, an expectation value of the random variables by maximum likelihood estimation according to the number of hits.

5. A non-transitory computer-readable storage medium storing instructions, wherein
the instructions are executed by a system,
the system includes:
a quantum computing unit including a manipulation unit that manipulates a quantum state, a state maintaining unit that maintains the quantum state, and a measurement unit that observes the quantum state; and
a classical computing unit that performs post-processing based on output from the quantum computing unit, and
when executed by the system, the instructions perform a method, the method comprising:
obtaining, by the manipulation unit, a first operator that produces a superposition state of a plurality of random variables;
performing, by the manipulation unit, iteration of a first operation and a second operation on an initial quantum state using the state maintaining unit to produce a final quantum state, the first operation producing a second state by performing a computation that inverts a first state with respect to a state obtained by applying a Hermitian conjugate of the first operator to a quantum state where a last bit of a bit string is 0, the second operation performing a computation that inverts the second state with respect to the first state, thereby producing a new first state;
measuring, by the measurement unit, the bit string in the final quantum state;
recording, by the measurement unit and in the classical computing unit, a number of hits that is a number of times a quantum state where all bits of the bit string are 0 is observed; and
calculating, by the classical computing unit, an expectation value of the random variables by maximum likelihood estimation according to the number of hits.

\* \* \* \* \*